United States Patent

Papaioannou

[15] 3,682,942
[45] Aug. 8, 1972

[54] PREPARATION OF 2-(2-AMINO-1,3,4-THIADIAZOL-5-YL)-1-SUBSTITUTED-5-NITROIMIDAZOLES

[72] Inventor: Christos George Papaioannou, 7 Kingsbridge Road, Somerset, N.J. 08873

[22] Filed: March 19, 1970

[21] Appl. No.: 21,198

Related U.S. Application Data

[63] Continuation-in-part of Ser. No. 864,873, Oct. 8, 1969, abandoned.

[52] U.S. Cl. ..........................................260/306.8 D
[51] Int. Cl. ..............................................C07d 91/62
[58] Field of Search..............................260/306.8 D

[56] References Cited

UNITED STATES PATENTS

| | | |
|---|---|---|
| 2,943,980 | 7/1960 | Maffil et al. ........260/306.8 D |
| 3,161,505 | 12/1964 | Tomanek............260/306.8 D |
| 3,332,942 | 7/1967 | Breivogel............260/306.8 D |
| 3,419,575 | 12/1968 | Griss...................260/306.8 D |

OTHER PUBLICATIONS

Elderfield (ed.), " Heterocyclic Compounds," Vol. 7, Wiley, N.Y., 1961, p. 590.

*Primary Examiner*—Alex Mazel
*Assistant Examiner*—R. J. Gallagher
*Attorney*—Ernest Y. Miller

[57] ABSTRACT

Methods of preparing 2-(2-amino-1,3,4-thiadiazol-5-yl)-1-substituted-5-nitroimidazoles from 1-substituted-2-cyano-5-nitroimidazoles by reaction with thiosemicarbazide and a strong acid. The products produced are useful for the control of bacterial, parasitic and protozoal infections in poultry and animals.

11 Claims, No Drawings

PREPARATION OF 2-(1-AMINO-1,3,4-THIADIAZOL-5-YL)-1-SUBSTITUTED-5-NITROIMIDAZOLES

This application is a continuation-in-part of my application ser. No. 864,873, filed Oct. 8, 1969, now abandoned.

DESCRIPTION OF THE INVENTION

The present invention relates to the preparation of substituted nitroimidazolylthiadiazoles. More particularly, it relates to the preparation of compounds of the formula:

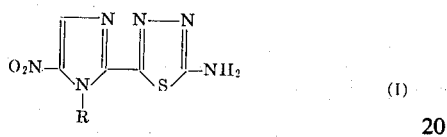

wherein R is selected from the group consisting of loweralkyl, loweralkanoyloxyloweralkyl and benzoyloxyloweralkyl. The terms loweralkyl and loweralkanoyl, in all instances, are intended to include those having one to four carbon atoms.

The starting material for the process of the present invention is described in U.S. Pat. No. 3,341,549 and has the following structure:

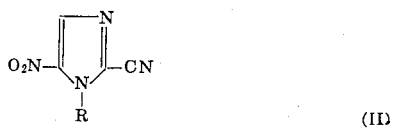

wherein R is as hereinbefore described.

In accordance with the preferred method of this invention the 1-substituted-2-cyano-5-nitroimidazole (Compounds II) is contacted with thiosemicarbazide in the presence of a strong acid under anhydrous conditions. The strong acid may be either a mineral acid or an organic acid, such as, for example, sulfuric acid, hydrogen chloride, hydrogen bromide, hydrogen fluoride, trifluoroacetic acid, or trichloroacetic acid. When the acid is a gas, the reaction may be carried out in an inert solvent, such as, for example, dimethylformamide or dimethylacetamide.

The reaction can also be carried out in the presence of up to about 100 g. of water per 100 ml. of acid (percent w/v). Best results with water present are obtained when it is present at from 30 percent to 40 percent.

The reaction may be carried out within a temperature range of from 0° to 120° C. However, the preferred temperature range and the time required to carry out the reaction is very much dependent upon the particular acid and solvent being used. For example, with hydrogen fluoride as the acid, the temperature range can be from 0° to 25° C. and with trifluoroacetic acid from 0° to 75° C., the upper limit being determined by the boiling point of the acid at atmospheric pressure. On the other hand, when hydrogen chloride with dimethylformamide as the solvent is used, the temperature range can be from 25° to 120° C. The time usually required to complete the reaction can vary from 1 to 120 hours and depends upon the temperature range and the acid used. For any particular acid, the higher the temperature used, the shorter the time required.

The present invention provides in a single step a direct method of preparing the nitroimidazolylthiadizoles (Compounds I) under atmospheric condition from relatively simple intermediates and reaction conditions. Thus, the present process results in considerable economic advantage.

The process of this invention is highly effective for the preparation of compounds useful for the control of bacterial, parasitic, and protozoal infections in poultry and animals. They are particularly useful as antimicrobial agents effective against *Trichomonas vaginallis* and *Salmonella gallinarum* infections in poultry and animals as described in U.S. Pat. No. 3,452,035 by Berkelhammer et al.

SPECIFIC DISCLOSURE

The following examples describe in detail the methods of this invention for the preparation of representative nitroimidazolylthiadiazoles (I) Parts are by weight unless otherwise indicated.

EXAMPLE 1

A mixture of 2-cyano-1-methyl-5-nitroimidazole (2.0 g., 0.0132 m.), thiosemicarbazide (1.31 g., 0.0144 m.), and 20 ml. of dimethylformamide, is prepared and anhydrous hydrogen chloride (14 g., 0.38 m.) is bubbled in. The reaction mixture is then heated at 60°–65° C. for 22 hours. The mole ratio of nitroimidazole:HCl is 1:29. There is obtained a yield of 53 percent of 2-(2-amino-1,3,4-thiadiazol-5-yl)-1-methyl-5-nitroimidazole.

EXAMPLE 2

To 2-cyano-1-methyl-5-nitroimidazole (2.0 g., 0.0132 m.) is added thiosemicarbazide (1.31 g., 0.0144 m.) and anhydrous trifluoroacetic acid (10 ml.) and the mixture is reacted for 16 hours at 40° C. There is obtained a 57 percent yield of 2-(2-amino-1,3,4-thiadiazol-5-yl)-1-methyl-5-nitroimidazole. When the reaction is conducted for an additional 5 hours at 60°–65 C., another 16 percent of product is obtained; total yield 73 percent.

This example illustrates an alternative method of preparing 2-(2-amino-1,3,4-thiadiazol-5-yl)-1-methyl-5-nitroimidazole wherein the strong organic acid functions as both the reactant acid and solvent.

EXAMPLE 3

Following the procedure of Example 2, except for reacting for 16 hours at 72° C. (refluxing), there is obtained a 67 percent of 2-(2-amino-1,3,4-thiadiazol-5-yl)1-methyl-5-nitroimidazole. When the reaction is conducted for 112 hours at room temperature (25° C.) there is obtained a yield of 56 percent of 2-(2-amino-1,3,4-thiadiazol-5-yl)-1-methyl-5-nitroimidazole.

EXAMPLE 4

Using the procedure described in Example 1 and substituting 2-cyano-1-(β-acetoxyethyl)-5-nitroimidazole in place of 2-cyano-1-methyl-5-nitroimidazole the product 2-(2-amino-1,3,4- thiadiazol-5-yl)-1-(β-acetoxyethyl)-5-nitroimidazole is obtained.

EXAMPLE 5

When the procedure described in Example 1 is used and 2-cyano-1-(β-benzoyloxyethyl)-5-nitroimidazole replaces 1-methyl-2-cyano-5-nitroimidazole, the product 2-(2-amino-1,3,4-thiadiazol-5-yl)-1-(β-benzoyloxyethyl)-5-nitroimidazole is obtained.

EXAMPLE 6

A mixture of 2-cyano-1-methyl-5-nitroimidazole (2.00 g., 0.0132 mole), thiosemicarbazide (1.32 g., 0.0144 mole) and anhydrous hydrogen fluoride (15 ml.) is stirred at room temperature for 114 hours then drowned by excess water. There is obtained a yield of 84 percent of 2-(2-amino-1,3,4-thiadiazol-5-yl)-1-methyl-5-nitroimidazole.

EXAMPLE 7

A mixture of 2-cyano-1-methyl-5-nitroimidazole (2.00 g., 0.0132 mole), thiosemicarbazide (1.32 g., 0.0144 mole) and trichloroacetic acid (17 g.) is heated on the steam bath for 3.5 hours. By working up the reaction mixture in the usual manner, the product 2-(2-amino-1,3,4-thiadiazol-5-yl)-1-methyl-5-nitroimidazole, is obtained.

EXAMPLE 8

A mixture of 2.00 grams (0.0132 mole) of 2-cyano-1-methyl-5-nitroimidazole, 1.32 grams (0.0144 mole) of thiosemicarbazide, 0.2 gram (0.011 mole) of water and 10 ml. of hydrogen fluoride is reacted at room temperature for 24 hours to give a 44.2 percent yield by assay of 2-amino-5-(1-methyl-5-nitro-2-imidazolyl)-1,3,4-thiadiazole. When the reaction is conducted for 64 hours, a 55.4 percent yield of product is obtained. Water is present in this reaction to the extend of 2 percent (w/v).

EXAMPLE 9

When the procedure of Example 8 is used except for the substitution of 0.6 gram (0.033 mole) of water instead of 0.2 grams of water, there is obtained a yield of 58.0 percent 2-amino-5-(1-methyl-5-nitro-2-imidazolyl)-1,3,4-thiadiazole by assay. When the reaction is conducted for a period of 64 hours, the yield is increased to 68.8 percent. Water is present in this reaction to the extent of 6 percent (w/v).

EXAMPLE 10

A solution of 1.00 gram (0.00658 mole) of 2-cyano-1-methyl-5-nitroimidazole and 0.66 gram (0.00725 mole) of thiosemicarbazide in 5.6 ml. of water and 5.6 ml. of hydrogen fluoride is reacted for 8 days at room temperature to give a 44 percent yield of 2-amino-5-(1-methyl-5-nitro-2-imidazolyl)-1,3,4-thiadiazole by assay of the title compound. In this reaction, 100 percent water is present (w/v).

EXAMPLE 11

The effect of water concentration on the rate of reaction using hydrogen fluoride as a catalyst is shown by the data in Table I, representing 12 experiments. In a typical experiment 2-cyano-1-methyl-5-nitroimidazole (2.00 g., 0.0132 mole) and thiosemicarbazide (1.32 g., 0.0145 mole) are placed in a polyethylene bottle, cooled in a dry ice-acetone bath and the calculated amount of water added. This is followed by the addition of 10 ml. of liquid hydrogen fluoride also cooled. The mixture is shaken for about 1 minute and allowed to react at 22° C. for 7.5 hours. The solution is poured into 300 ml. of water, stirred overnight, and the product filtered, washed with a total of 200 ml. water, 3 1-ml. portions of methanol, and dried. The amount of 2-(2-amino-1,3,4-thiadiazol-5-yl)-1-methyl-5-nitroimidazole is determined by assay to ± 1–2 percent.

TABLE I

| Expt. No. | Water % W/V | 2-(2-amino-1,3,4-thiadiazol-5-yl)-1-methyl-5-nitroimidazole % yield |
|---|---|---|
| 1 | 0.00 | 39.1 |
| 2 | 2.00 | 35.2 |
| 3 | 6.00 | 46.3 |
| 4 | 10.00 | 48.7 |
| 5 | 14.00 | 51.6 |
| 6 | 18.00 | 57.5 |
| 7 | 22.00 | 65.7 |
| 8 | 26.00 | 65.8 |
| 9 | 30.00 | 66.8 |
| 10 | 34.00 | 67.9 |
| 11 | 38.00 | 68.6 |
| 12 | 42.00 | 65.0 |

The above data shows that the rate of the reaction is dependent on water concentration up to an optimum of about 30—40 percent (W/V).

EXAMPLE 12

The following Table II shows data on nine experiments designed to show the effect of water on overall yield of product. The experiments are run as described in Example 11 above.

TABLE II

| Reaction Time Hours | Water % W/V | Crude Product % Yield | 2-(2-amino-1,3,4-thiadiazol-5-yl)-1-methyl-5-nitroimidazole % Yield |
|---|---|---|---|
| 7.5 | 0.00 | 47.9 | 39.1 |
| 7.5 | 6.00 | 55.9 | 46.3 |
| 24.00 | 0.00 | 60.3 | 57.0 |
| 24.00 | 6.00 | 59.0 | 58.0 |
| 63.26 | 0.00 | 70.4 | 58.2 |
| 63.26 | 6.00 | 77.2 | 68.8 |

The above data shows that the yield in an incomplete reaction (7.5 hours) and a complete reaction (63.26 hours) is increased by increasing concentration of water.

I claim:

1. A method of preparing nitroimidazolylthiadiazoles of the formula:

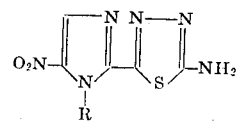

wherein R is selected from the group consisting of loweralkyl, loweralkanoyloxyloweralkyl and benzoyloxyloweralkyl, which comprises contacting a compound of the formula:

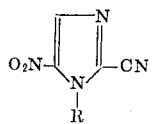

wherein R is as defined above, with thiosemicarbazide in the presence of a strong acid at a temperature within the range of 0° to 120° C. until a substantial amount of product is obtained and recovering said compound therefrom.

2. A method of preparing nitroimidazolylthiadiazoles according to claim 1, wherein the strong acid is a strong mineral acid and the reaction is carried out under anhydrous conditions.

3. A method of preparing nitroimidazolylthiadiazoles according to claim 1, wherein the starting material is 2-cyano-1-loweralkyl-5-nitroimidazole, the strong acid is hydrogen fluoride and the reaction is carried out in the presence of up to about 100 g. of water per 100 ml. of acid.

4. A method of preparing nitroimidazolylthiadiazoles according to claim 1, wherein the strong acid is a hydrohalogen gas and the reaction is carried out in an inert solvent.

5. A method of preparing nitroimidazolylthiadiazoles according to claim 1, wherein the starting material is 2-cyano-1-loweralkyl-5-nitroimidazole, the strong acid is hydrohalogen acid and the reaction is carried out under anhydrous conditions.

6. A method of preparing nitroimidazolylthiadiazoles according to claim 1, wherein the starting material is 2-cyano-1-(benzoyloxyloweralkyl)-5-nitroimidazole, and the strong acid is a strong mineral acid.

7. A method of preparing nitroimidazolylthiadiazoles according to claim 1, wherein the starting material is 2-cyano-1-($\beta$-benzoyloxyethyl)-5-nitroimidazole, the strong acid is hydrogen chloride and the reaction is carried out in the presence of dimethylformamide at a temperature within the range of 25° to 120° C.

8. A method of preparing nitroimidazolylthiadiazoles according to claim 1, wherein the starting material is 2-cyano-1-($\beta$-acetoxyethyl)-5-nitroimidazole, the strong acid is hydrogen chloride and the reaction is carried out in the presence of dimethylformamide at a temperature within the range of 25° to 120° C.

9. A method of preparing 2-(2-amino-1,3,4-thiadiazol-5-yl)-1-methyl-5-nitroimidazole which comprises contacting 2-cyano-1-methyl-5-nitroimidazole with thiosemicarbazide in the presence of trifluoroacetic acid at a temperature within the range of 0° to 75° C. for a period of from 1 hour to 120 hours and recovering said product therefrom.

10. A method of preparing 2-(2-amino-1,3,4-thiadiazol-5-yl)-1-methyl-5-nitroimidazole which comprises contacting 2-cyano-1-methyl-5-nitroimidazole with thiosemicarbazide in the presence of aqueous hydrogen fluoride at a temperature within the range of 0° to 75° C. for a period of from 1 hour to 120 hours and recovering said product therefrom.

11. A method of preparing 2-(2-amino-1,3,4-thiadiazol-5-yl)-1-methyl-5-nitroimidazole which comprises contacting 2-cyano-1-methyl-5-nitroimidazole with thiosemicarbazide in anhydrous liquid hydrogen fluoride at a temperature within the range of 0° to 25° C. and recovering said product therefrom.

* * * * *

UNITED STATES PATENT OFFICE
CERTIFICATE OF CORRECTION

Patent No. 3,682,942                     Dated August 8, 1972

Inventor(s) Christos George Papaioannou

It is certified that error appears in the above-identified patent and that said Letters Patent are hereby corrected as shown below:

Front page format, below data element identifier "[72]" insert -- [73] Assignee: American Cyanamid Company, Stamford, Connecticut -- .

Signed and sealed this 6th day of February 1973.

(SEAL)
Attest:

EDWARD M. FLETCHER, JR.                ROBERT GOTTSCHALK
Attesting Officer                      Commissioner of Patents